United States Patent [19]

Pedain et al.

[11] Patent Number: 5,216,107
[45] Date of Patent: Jun. 1, 1993

[54] BINDER COMPOSITIONS FOR STOVING LACQUERS AND A PROCESS FOR THE PRODUCTION OF COATINGS THEREFROM

[75] Inventors: Josef Pedain, Cologne; Friedrich Schrader, Leichlingen; Dieter Mager, Leverkusen; Hans-Heribert Burgdörfer, Cologne, all of Fed. Rep. of Germany

[73] Assignee: Bayer Aktiengesellschaft, Leverkusen, Fed. Rep. of Germany

[21] Appl. No.: 727,735

[22] Filed: Jul. 10, 1991

[30] Foreign Application Priority Data

Jul. 17, 1990 [DE] Fed. Rep. of Germany ....... 4022660

[51] Int. Cl.$^5$ ............................................. C08G 18/81
[52] U.S. Cl. ....................................... 528/45; 528/87; 528/110; 525/75; 525/124; 540/202; 560/169
[58] Field of Search ............................ 528/45, 87, 110; 525/124, 75; 540/202; 560/169

[56] References Cited

U.S. PATENT DOCUMENTS

| | | | |
|---|---|---|---|
| 3,770,703 | 11/1973 | Gruber et al. | 260/77.5 TB |
| 4,007,215 | 2/1977 | Hartmann et al. | 260/468 J |
| 4,101,530 | 7/1978 | Burkhardt et al. | 528/45 |
| 4,132,843 | 1/1979 | Dalibor | 528/45 |
| 4,248,978 | 2/1981 | de Cleur et al. | 525/124 |
| 4,332,965 | 6/1982 | Dalibor | 560/169 |
| 4,373,081 | 2/1982 | Nachtkamp et al. | 528/45 |
| 4,595,534 | 6/1986 | Scholl | 260/239 |
| 4,794,154 | 12/1988 | Benefiel | 528/45 |
| 4,879,198 | 11/1989 | Tavernier et al. | 430/106.6 |

FOREIGN PATENT DOCUMENTS

| | | |
|---|---|---|
| 2623081 | 11/1977 | Fed. Rep. of Germany . |
| 2639491 | 2/1978 | Fed. Rep. of Germany . |
| 1402658 | 8/1975 | United Kingdom . |
| 1442024 | 7/1976 | United Kingdom . |
| 1523103 | 8/1978 | United Kingdom . |

Primary Examiner—John Kight, III
Assistant Examiner—Duc Truong
Attorney, Agent, or Firm—Joseph C. Gil; Thomas W. Roy

[57] ABSTRACT

The present invention relates to a binder composition containing
a) 20 to 70% by weight of oligomerization products of 1,6-diisocyanatohexane, the oligomerization products having isocyanate groups at least partially blocked with blocking agents for isocyanate groups and containing at least 50% by weight, based on the weight of the oligomerization products, of blocked uretdione diisocyanates corresponding to formula (I)

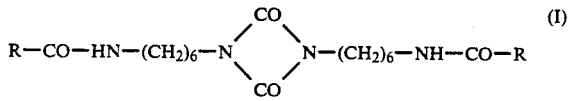

wherein R represents the residue formed by removal of the active hydrogen atom from a monofunctional blocking agent, and
b) 30 to 80% by weight of a polyol component containing a mixture of
b1) 100 parts by weight of an alkoxylation product of bisphenol A corresponding to formula (II)

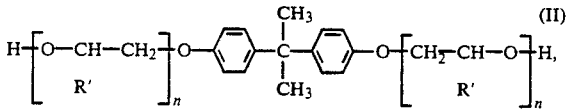

wherein R' is hydrogen or a methyl group and n is a whole or fractional number from 1 to 2,
b2) 20 to 200 parts by weight castor oil and
b3) 0 to 40 parts by weight of other organic polyhydroxyl compounds.

The present invention also relates to a process for the production of coatings by coating heat-resistant substrates with a heat-curing coating composition containing the binder compositions of the present invention and subsequently curing the coatings at 90° to 220° C.

8 Claims, No Drawings

BINDER COMPOSITIONS FOR STOVING LACQUERS AND A PROCESS FOR THE PRODUCTION OF COATINGS THEREFROM

BACKGROUND OF THE INVENTION

1. Field of the Invention

The present invention relates to new binder compositions which are suitable for the production of solventless or low-solvent, one-component polyurethane stoving lacquers and to a process for the production of coatings on heat-resistant substrates using coating compositions containing the new binder composition.

2. Description of the Invention

The use of blocked isocyanates for the production of heat-curing polyurethane coatings is known (cf. for example Kunststoff-Handbuch, Vol. VII, Polyurethane, Carl Hanser Verlag Munchen, 1966, pages 11–13 and 21 et seq). A number of compositions suitable for the reversible blocking of isocyanate groups have been described. Among such compositions, particular significance is attributed to the class of C-H acidic compositions (such as malonic acid esters and acetoacetic acid esters) by virtue of their favorable chemical and physiological properties (cf. for example DE-OSS 2,342,603, 2,436,872, 2,550,156, 2,612,783, 2,612,784 and 2,612,785). Polyurethane stoving lacquers based on aliphatic polyisocyanates blocked with malonic acid esters or acetoacetic acid esters and organic polyhydroxyl compositions are described in DE-OS 2,550,156, DE-AS 2,623,081 and DE-AS 2,639,491.

The polyurethane stoving lacquers according to the cited publications are unsuitable for the production of high-impact coatings. However, there is an increasing demand for coating compositions that are suitable for the production of high-impact, chip resistant coatings for protecting the surfaces of industrial goods such as machine parts, vehicle bodies or transport containers. An improvement in this regard is disclosed in EP-A-0,053,766 which is directed to systems suitable for the production of chip resistant fillers.

All previously known one-component systems based on blocked polyisocyanates and organic polyhydroxyl compositions are attended by the disadvantage that either they must contain at least 40% solvent for application or they are based on aromatic polyisocyanates which turn yellow when the coatings are exposed to heat.

In addition to the above-mentioned one-component polyurethane systems, compositions of blocked isocyanates with organic diamines are disclosed in DE-AS 2,131,299. Although these systems guarantee highly elastic surface protection, they are attended by the disadvantage that they only have a limited pot life of at most a few days, i.e., they are only "quasi one-component resins." In addition, low molecular weight amines can be released during the stoving process which can give rise to odor emissions and, in addition, can be toxicologically harmful.

Accordingly, it is an object of the present invention to provide new binder compositions which 1) are suitable for the production of fillers, intermediate primers or thick chip resistant coatings for automobiles,
2) are not be attended by the disadvantages of known compositions,
3) are suitable for the production of high-impact, highly elastomeric coatings of the type required for the protection of vehicle bodies, machine parts, transport containers or other industrial goods,
4) are toxicologically safe,
5) are suitable for the production of coating compositions which could readily be processed despite solids contents of more than 60% by weight, preferably more than 70% by weight, and
6) are suitable for the production of coatings which are resistant to yellowing on exposure to heat because binders for fillers and intermediate primers must not turn yellow, particularly when coated with a clear lacquer.

These objects may be achieved in accordance with the binders of the present invention as described in detail hereinafter.

SUMMARY OF THE INVENTION

The present invention relates to a binder composition containing a) 20 to 70% by weight of oligomerization products of 1,6-diisocyanatohexane, the oligomerization products having isocyanate groups at least partially blocked with blocking agents for isocyanate groups and containing at least 50% by weight, based on the weight of the oligomerization products, of blocked uretdione diisocyanates corresponding to formula (1)

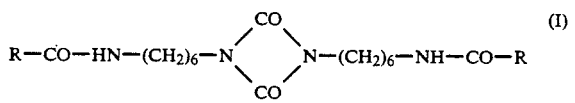

wherein
R represents the residue formed by removal of the active hydrogen atom from a monofunctional blocking agent, and b) 30 to 80% by weight of a polyol component containing a mixture of b1) 100 parts by weight of an alkoxylation product of bisphenol A corresponding to formula (II)

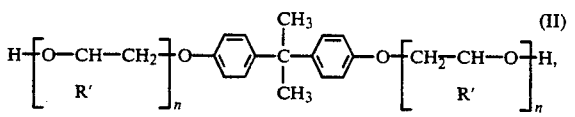

wherein
R' is hydrogen or a methyl group and
n on average is a whole or fractional number from 1 to 2, b2) 20 to 200 parts by weight castor oil and
b3) 0 to 40 parts by weight other organic polyhydroxyl compounds.

The present invention also relates to a process for the production of coatings by coating heat-resistant substrates with a heat-curing coating composition containing the binder compositions of the present invention and subsequently curing the coatings at 90° to 220° C.

DETAILED DESCRIPTION OF THE INVENTION

Component a) of the binder composition according to the invention is an oligomerization product of 1,6-diisocyanatohexane containing uretdione groups and isocyanate groups which are at least partly blocked with blocking agents for isocyanate groups. Component a) generally contains 0 to 5% by weight, preferably 0 to 2.5% by weight of free isocyanate groups. Depending upon the molecular weight of the blocking agent, the content of blocked isocyanate groups (expressed as NCO, molecular weight=42) is 10 to 18% by weight, preferably 13 to 16% by weight. The content of uretdione groups (expressed as $N_2C_2O_2$, molecular weight=84) is 6 to 14, preferably 8 to 12% by weight.

The oligomerization products of 1,6-diisocyanatohexane are polyisocyanate mixtures which contain at least 50% consist of the uretdione diisocyanate

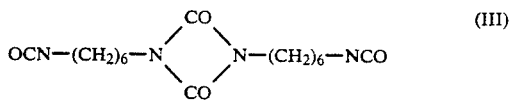

(III)

and may also contain urethane and/or isocyanurate groups. The optional presence of isocyanurate groups in the polyisocyanate mixture is attributable to the fact that many of the catalysts used for the dimerization of diisocyanates simultaneously accelerate the trimerization of isocyanate groups. The optional presence of urethane groups is attributable to the frequent use of co-catalysts containing hydroxyl groups.

The oligomerization of 1,6-diisocyanatohexane may be carried out by known methods, e.g., as described in DE-OS 1,670,720, DE-OS 3,437,635, DE-OS 3,432,081, DE-OS 3,809,261 or in German Patent Application P 39 00 053.2.

Before blocking, the oligomerization products generally have an NCO content of 15 to 23% by weight. As previously mentioned, these isocyanate groups are at least partially blocked in known manner. The blocking agents used are the known monofunctional blocking agents such as caprolactam, malonic acid diethyl ester, acetoacetic acid ethyl ester and oximes such as butanone oxime. Butanone oxime is the preferred blocking agent.

After the blocking reaction, at least partially blocked uretdione polyisocyanates are obtained which contain at least 50% by weight of compounds corresponding to formula I.

The polyol component b) contains a mixture of 100 parts by weight component of b1), 20 to 200, preferably 35 to 100 parts by weight of component b2) and 0 to 40, preferably 10 to 20 parts by weight of component b3).

Component b1) is an alkoxylation product of bisphenol A. Ethylene oxide and/or propylene oxide are used as the alkoxylating agent in a quantity of 2 to 4 moles per mole of bisphenol A. These alkoxylation products correspond to formula II. The hydroxyl value of these alkoxylation products is 243 to 354, preferably 300 to 340. The propoxylation products of bisphenol A are particularly preferred.

Component b2) is castor oil. Commercially available types may be used. A castor oil having a hydroxyl value of 165 is eminently suitable.

The optional component b3) is a relatively high molecular weight polyhydroxyl compound which is known from polyurethane chemistry. Suitable polyhydroxyl compounds include polyhydroxy polyesters, polyhydroxy polyethers and other polymers containing hydroxyl groups, e.g., the polyhydroxy polyacrylates. These compositions generally have a hydroxyl value of 50 to 200, preferably 80 to 130. Polyhydroxy polyesters are preferably used as the optional component b3).

Examples of polyhydroxy polyacrylates include the known copolymers of styrene with esters of acrylic acid and/or methacrylic acid. Hydroxyalkyl esters of these acids, such as the 2-hydroxyethyl, 2-hydroxypropyl, and 2-, 3- or 4-hydroxybutyl ester, are used for introducing the hydroxyl groups.

Example of polyether polyols include the known ethoxylation and/or propoxylation products of 2- to 4-functional starter molecules, such as water, ethylene glycol, propane diol, trimethylol propane, glycerol and/or pentaerythritol.

Examples of the preferred polyester polyols include the known reaction products of polyhydric alcohols (such as the previously mentioned alkane polyols) with less than equivalent quantities of polycarboxylic acids or polycarboxylic anhydrides, preferably dicarboxylic acids or dicarboxylic anhydrides. Suitable polycarboxylic acids and polycarboxylic anhydrides include adipic acid, phthalic acid, isophthalic acid, phthalic anhydride, tetrahydrophthalic anhydride, hexahydrophthalic anhydride, maleic acid, maleic anhydride, Diels-Alder adducts thereof with cyclopentadiene, fumaric acid or dimeric and trimeric fatty acids. Mixtures of the polyhydric alcohols mentioned by way of example or mixtures of the acids or acid anhydrides mentioned by way of example may also be used in the production of the polyester polyols.

The polyester polyols are produced by known methods, as described for example in Houben-Weyl, Methoden der Organischen Chemie, Vol. XIV/2. G. Thieme-Verlag, Stuttgart, 1963, pages 1-47.

The preferred binder compositions according to the invention contain 40 to 60% by weight of polyisocyanate component a) and 40 to 60% by weight of a polyol component b). Within the limits of the foregoing disclosure, the type and quantities of individual components are selected such that the binder compositions have an equivalent ratio of free and blocked isocyanate groups of component a) to hydroxyl groups of component b) of most 1:1, preferably 0.8:1 to 1:1.

The binder compositions according to the invention may be used in accordance with the invention either as such or in combination with the known auxiliaries and additives which are typically used in coatings technology.

The coating compositions based on the compositions according to the invention preferably have solids contents of more than 60% by weight, preferably more than 70% by weight. The solvents optionally used are known for use in coating compositions and include ethyl acetate, methyl glycol acetate, ethyl glycol acetate, diethylene glycol monomethyl ether acetate, methyl ethyl ketone, methyl isobutyl ketone, toluene, xylene and mixtures of these solvents.

In addition to the binder composition, solvents and plasticizers, the coating compositions may also contain the auxiliaries and additives which are known in paint technology such as pigments, fillers, flow control agents and catalysts which accelerate the crosslinking reaction, as previously mentioned. Dibutyl tin dilaurate is a particularly suitable catalyst.

The coating compositions according to the invention are mixtures which are liquid at room temperature and stable in storage.

To carry out the process according to the invention for the production of coatings the coating compositions are applied in one or more layers to heat-resistant substrates by known methods, for example, by spray coating, spread coating, dip coating, flood coating, roll coating or knife coating. The process according to the invention is suitable for the production of coatings on metals, plastics, wood or glass. The process according to the invention is particularly suitable for the production of coatings on steel plates of the type used, for example, in the manufacture of vehicle bodies, machines, cladding plates, drums and containers. The substrates to be coated in the process according to the invention may be provided with suitable primers before the process according to the invention is carried out. The quantity of coating composition used in the process according to the invention is generally selected to obtain dry film thicknesses of about 0.02 to 0.3 mm. However, considerably thicker layers may also be produced.

After application to the substrates, the coating compositions according to the invention are cured by heating to a temperature of 90° to 220° C., preferably 130° to 180° C.

If necessary for optical reasons, the cured coatings may readily be coated with top coats. The fact that the coating compositions according to the invention can be applied in comparatively thin layers is an advantage in this regard. In contrast to the chip resistant coatings of the prior art, which must be applied in thick layers, the coating compositions of the present invention do not present any problems in regard to flow and surface structure and, accordingly, may themselves be coated with high-gloss surface lacquers. This property, coupled with their high resistance to yellowing, enables the coating compositions according to the invention to be used in areas where previously an elastomeric surface protection could not be applied on aesthetic grounds, for example, on the visible parts of vehicle bodies which are exposed to severe mechanical stresses by chipping.

The surface protection afforded by the process according to the invention is demonstrated in the following examples. It is emphasized that the resistance of the coatings to chipping is attributable to a composition having both high elasticity and good adhesion to the substrates to be protected. All parts and percentages are by weight unless otherwise indicated.

EXAMPLES

Example 1—Production and description of the starting materials

1.1 Preparation of an oligomerization product of 1,6-diisocyanatohexane 2,000 g of 1,6-diisocyanatohexane were introduced into a suitable reaction vessel and heated to 50° C. 20 g of 2,2,4-trimethylpentane-1,3-diol and 30 g of tri-n-butyl phosphine were then introduced in that order with continuous stirring in a nitrogen atmosphere. The exothermic reaction was kept at 60° C. by cooling. After a reaction time of 6 h, the reaction mixture had an NCO content of 42.5%. The reaction was then terminated by adding 16.5 g of toluene sulfonic acid methyl ester and heating for 2 hours at 80° C. The crude product thus obtained was freed from excess starting diisocyanate in a falling tube evaporator (165° C./1 mbar) and a thin layer evaporator (150° C./0.30 mbar).

The resulting product had the following data:

| NCO content | 21.6% |
|---|---|
| Viscosity mPa · s/23° C.) | 200 |
| Hazen color value (units) | 50 |
| Free starting diisocyanate | 0.2% |

Analysis by gel chromatography showed that 72% of the oligomerization product thus obtained was a compound corresponding to formula (III) and the remainder was a mixture of tris-(6-isocyanatohexyl)-isocyanurate, higher homologs thereof, urethane group-containing products and higher molecular weight homologs of uretdione diisocyanate (III).

1.2 Polyol component b1

A product (Dianol 33, available from Akzo Chemie) corresponding to the formula:

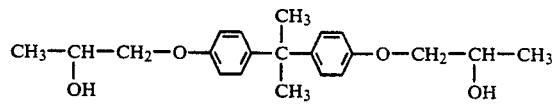

The product is a colorless liquid with a purity of more than 98% at 75° C.

1.3 Polyol component b2

Commercially available castor oil having a hydroxyl value of 165. Castor oil is a triglyceride of vegetable fatty acids, predominantly (85 to 90%) ricinoleic acid.

1.4 Polyol component b3

A polyester was used as polyol component b3 in the following examples. It was prepared from the following raw materials:

| | |
|---|---|
| 50.4 | parts by weight neopentyl glycol |
| 16.8 | parts by weight adipic acid |
| 14.9 | parts by weight hexahydrophthalic anhydride |
| 16.0 | parts by weight maleic anhydride |
| 0.01 | part by weight of a 50% solution in xylene of 1-methyl-2,5-dihydroxy-benzene |
| 10.7 | parts by weight dicyclopentadiene. |

A reactor of suitable dimensions equipped with a packed column and an oil heating system was used for the production of the polyester.

After the reactor had been purged with nitrogen, neopentyl glycol was introduced. The same volume of nitrogen was passed through the starting material which was then heated to 125° C. The remaining starting materials, except for the dicyclopentadiene, were then added at that temperature at such a rate that the internal temperature did not fall below 120° C. The reaction mixture was then heated to 190° C. The heating was controlled such that the head temperature did not exceed 105° C. (approx. 5 h). The acid value was then determined and the esterification reaction was continued until the acid value had fallen to 50–70. When this acid value was reached, the reaction mixture was cooled to 150° C. and the dicyclopentadiene was added at that temperature. The supply of nitrogen was interrupted and the reactor was sealed. The reaction mixture was heated for 5 h to 170° C., a pressure of 1 bar being established; the pressure then falls gradually. More nitrogen was then passed through the resin melt which was then heated to 210° C. at such a rate that the head temperature did not exceed 105° C. The condensation reaction was continued until the flow time according to DIN 53 211 (70% in xylene, 23° C.) was 50–60 sec. The acid value was then approximately 10. A light yellow resin having a hydroxyl value of 120 was obtained.

Example 2—Production of a one-component polyurethane stoving system according to the invention 349 parts of the isocyanate component (from Example 1.1) were introduced at 20° to 25° C. into a suitable stirred reactor and a total of 153 parts of butanone oxime were added in portions, a temperature of 60° to 70° C. being maintained by cooling. After all the butanone oxime had been added, followed by stirring for 15 minutes, no more free NCO groups could be detected. A mixture of 272 parts of polyol component b1 (Example 1.2), 117 parts of polyol component b2 (Example 1.3) and 44 parts of polyol component b3 (Example 1.4) were then added at approximately 50° C.

A solventless, colorless, clear melt of a one-component urethane stoving resin was obtained after thorough mixing. The content of uretdione groups in the one-component resin was approximately 6.7% and the content of blocked isocyanate groups was approximately 8%. The equivalent ratio of free isocyanate groups and isocyanate groups blocked with blocking agents in the isocyanate component to hydroxyl groups in polyol components b1, b2 and b3 was approximately 0.9:1.

Example 3—Testing of the one-component urethane stoving resin for stability in storage To determine its storage life, the one-component resin of Example 2 was adjusted to a solids content of 95% by mixing with isobutanol. A viscous liquid having a viscosity of 11,000 mPa.s (23° C.) was obtained. A sample of the liquid was stored at 50° C. in a sealed vessel. After 30 days, the product had a viscosity of 12,500 mPa.s (23° C.). A sample stored for 180 days at room temperature did not increase in viscosity. This demonstrates that the product was sufficiently stable in storage to be used as a one-component coating composition.

Example 4–Use as a one-component binder 235 g of barium sulfate (filler), 78 g of titanium dioxide pigment, 0.8 g of carbon black, 4 g of iron oxide pigment and relatively small quantities of anti-sedimenting agent, dispersion aid, catalyst and flow control agent were added to 413 g of the one-component resin of Example 3 (95% solution in isobutanol). The mixture was then titrated in a dissolver with 219 g of a solvent mixture of methoxypropyl acetate, ethoxypropyl acetate, butyl acetate and solvent naphtha (alkylbenzene mixture) in a ratio of 4:1:1:4. A sprayable one-component coating composition was obtained having a flow time according to DIN 53 211 (4 mm orifice) of 30 seconds and a solids content of approximately 75%.

Phosphated steel plates primed by electrodeposition coating were spray-coated with this coating composition. The one-component resin was cured in 30 minutes at 150° C. Crosslinked films having a layer thickness of approximately 45 μm were obtained. The films were solvent-resistant and had a high surface hardness.

The crucial test of the coatings was carried out with a VDA (Verband der Automobilindustrie) chip tester of the model 508 type made by Erichsen GmbH & Co., D 5870 Hemer-Sundwig, Federal Republic of Germany.

In this test apparatus, the test specimens were bombarded in a standard conditioning atmosphere with defined, sharp-edged steel shot projected by compressed air.

The damage which the test specimens suffer during the bombardment was determined by comparison with sample plates. Evaluation of the damage was based on a scale of 0 to 5 in which
0–1 = no damage
1 = very slight damage
5 = very serious damage.

All of the test specimens coated with the coating composition based on the binder according to the invention were in the 0 to 1 or 1 range. In other words, although the lacquer was only applied in a relatively thin layer, it was damaged only slightly, if at all, by the bombardment, which demonstrates the high elasticity and good adhesion of the coating.

The high resistance of the coating produced in accordance with the invention in the bombardment test demonstrates the suitability of the binder composition according to the invention for the production of primers and fillers, even for visible parts of of vehicle bodies which are severely stressed by chipping, but which are very difficult to lacquer with thick layers for aesthetic reasons.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A one-component, storage stable, liquid binder composition comprising hexamethylene diisocyanate
a) 20 to 70% by weight of oligomerization products of 1,6-diisocyanatohexane, said oligomerization products having isocyanate groups at lest partially blocked with blocking agents for isocyanate groups and containing at lest 50% by weight, based on the weight of said oligomerization products, of blocked uretdione diisocyanates corresponding to formula (I)

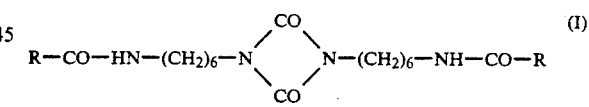

wherein
R represents the residue formed by removal of the active hydrogen atom from a monofunctional blocking agent, and
b) 30 to 80% by wight of a polyol component containing a mixture of
b1) 100 parts by weight of an alkoxylation product of bisphenol A corresponding to formula (II)

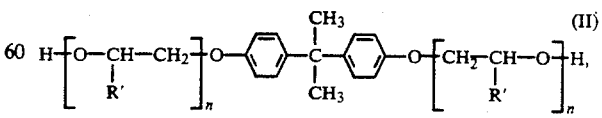

wherein
R' is hydrogen or a methyl group and
n on average is a whole or fractional number from 1 to 2.
b2) 20 to 200 parts by weight castor oil and b3) 0 to 40 parts by weight other organic polyhydroxyl compounds.

2. The binder composition of claim 1 wherein said monofunctional blocking agent comprises butanone oxime.

3. The binder composition of claim 1 wherein polyol component b3) is present in a positive amount, has a hydroxyl value of 50 to 200 and comprises a polyhydroxy polyether, a polyhydroxy polyester, a polyhydroxy polyacrylate or mixtures thereof.

4. The binder composition of claim 2 wherein polyol component b3) is present in a positive amount, has a hydroxyl value of 50 to 200 and comprises a polyhydroxy polyether, a polyhydroxy polyester, a polyhydroxy polyacrylate or mixtures thereof.

5. A process for the production of a coating which comprises
i) coating a heat-resistant substrate with a one-component, storage stable, binder composition comprising
a) 20 to 70% by weight of oligomerization products of 1,6-diisocyanatohexane, said oligomerization products having isocyanate groups at least partially blocked with blocking agents for isocyanate groups and containing at least 50% by weight, based on the weight of said oligomerization products, of blocked uretdione diisocyanates corresponding to formula (I)

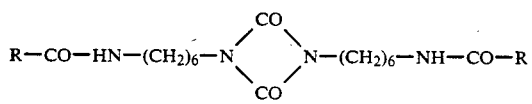

wherein

R represents the residue formed by removal of the active hydrogen atom form a monofunctional blocking agent, and b) 30 to 80% by wight of a polyol component containing a mixture of b1) 100 parts by weight of an alkoxylation product of bisphenol A corresponding to formula (II)

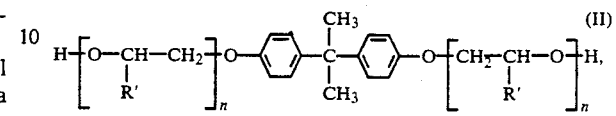

wherein
R' is hydrogen or a methyl group and
n on average is a whole or fractional number from 1 to 2, b2) 20 to 200 parts by weight castor oil and b3) 0 to 40 parts by weight other organic polyhydroxyl compounds, and ii) subsequently curing the coating at 90° to 220° C.

6. The process of claim 5 wherein said monofunctional blocking agent comprises butanone oxime.

7. The process of claim 5 wherein polyol component b3) is present in a positive amount, has a hydroxyl value of 50 to 200 and comprises a polyhydroxy polyether, a polyhydroxy polyester, a polyhydroxy polyacrylate or mixtures thereof.

8. The process of claim 6 wherein polyol component b3) is present in a positive amount, has a hydroxyl value of 50 to 200 and comprises a polyhydroxy polyether, a polyhydroxy polyester, a polyhydroxy polyacrylate or mixtures thereof.

* * * * *

UNITED STATES PATENT AND TRADEMARK OFFICE
CERTIFICATE OF CORRECTION

PATENT NO. : 5,216,107
DATED : June 1, 1993
INVENTOR(S) : Josef Pedain et al

It is certified that error appears in the above-indentified patent and that said Letters Patent is hereby corrected as shown below:

<u>IN THE CLAIMS</u>:

In Claim 1, at column 8, line 34, delete "hexamethylene diisocyanate".

In Claim 1, at column 8, lines 37 and 39, correct "lest" to --least--.

Signed and Sealed this

Eighth Day of December, 1998

Attest:

BRUCE LEHMAN

*Attesting Officer*    *Commissioner of Patents and Trademarks*